Figure 1:
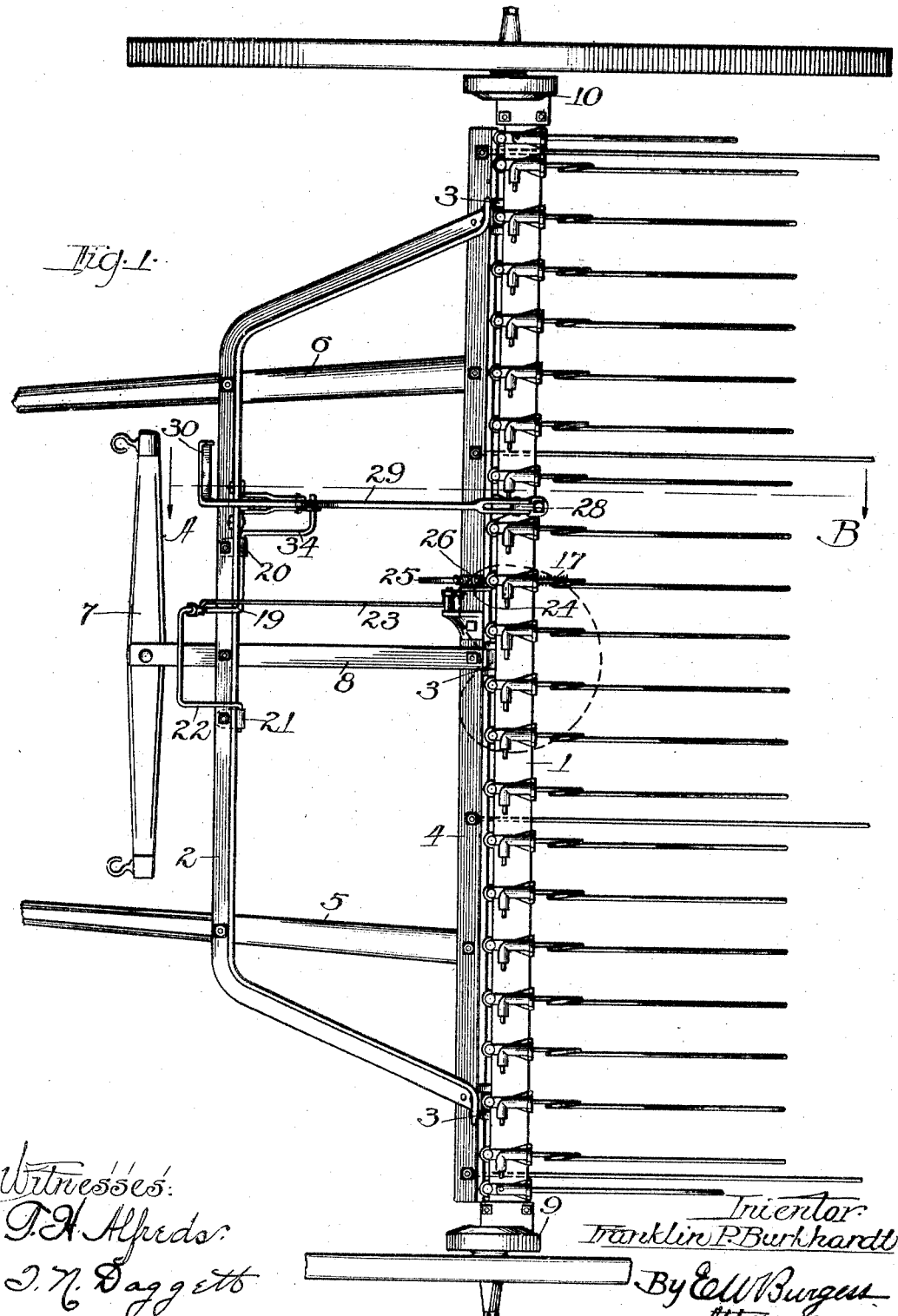

No. 766,928. PATENTED AUG. 9, 1904.
F. P. BURKHARDT.
HAY RAKE.
APPLICATION FILED FEB. 15, 1904.
NO MODEL. 4 SHEETS—SHEET 1.

Witnesses:
T. H. Alfreds
J. N. Daggett

Inventor
Franklin P. Burkhardt
By E. W. Burgess
Attorney

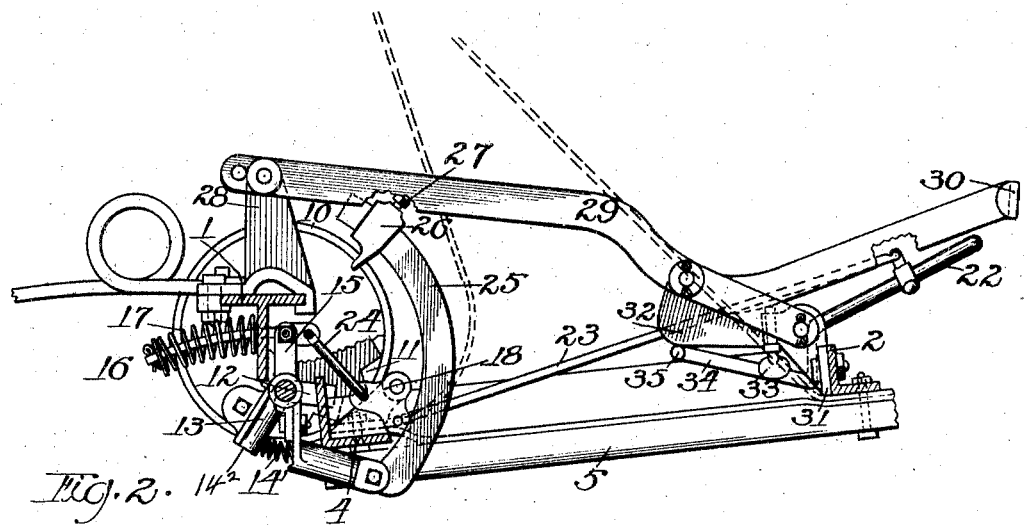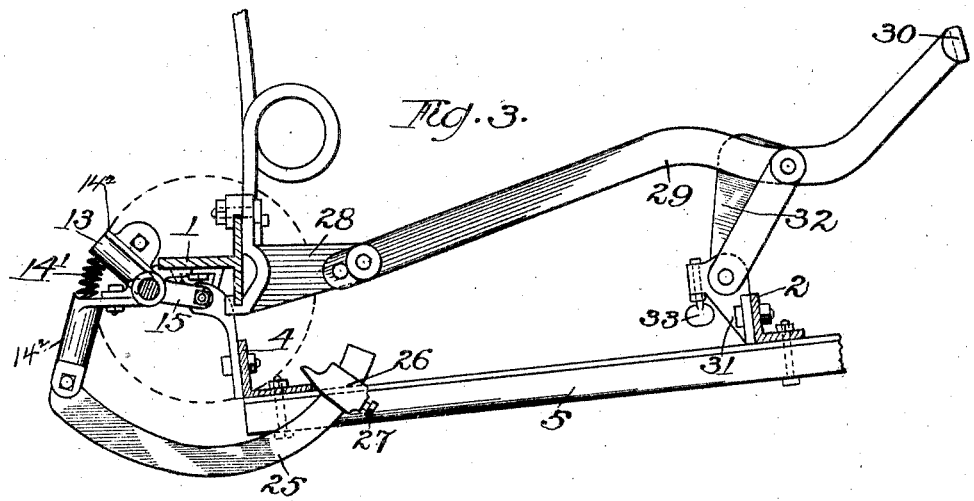

No. 766,928. PATENTED AUG. 9, 1904.
F. P. BURKHARDT.
HAY RAKE.
APPLICATION FILED FEB. 15, 1904.
NO MODEL. 4 SHEETS—SHEET 3.
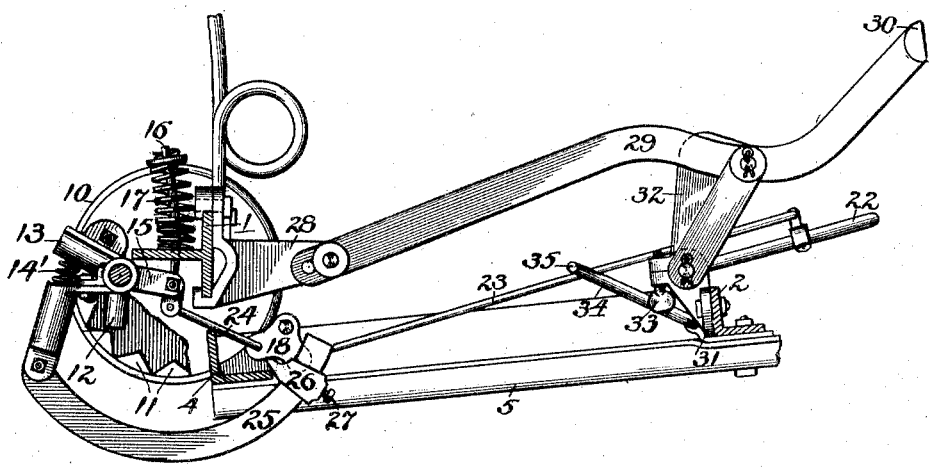
Fig. 3ª.
Witnesses:
P. V. Alfred.
J. N. Daggett.
Inventor
Franklin P. Burkhardt.
By E. W. Burgess
Attorney No. 766,928. PATENTED AUG. 9, 1904.
F. P. BURKHARDT.
HAY RAKE.
APPLICATION FILED FEB. 15, 1904.
NO MODEL. 4 SHEETS—SHEET 4.
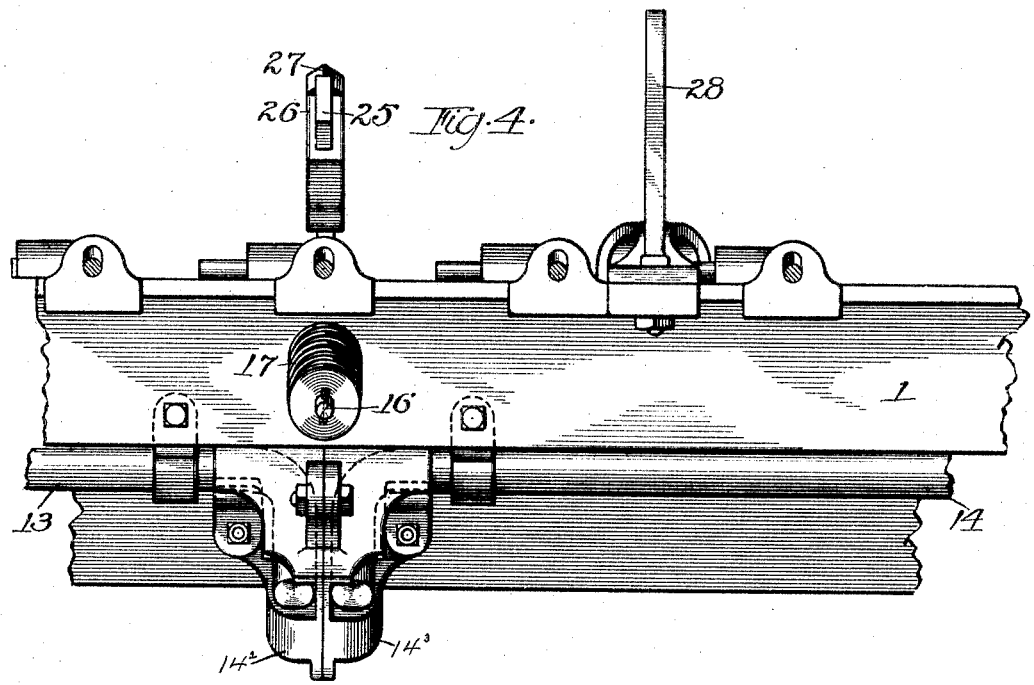
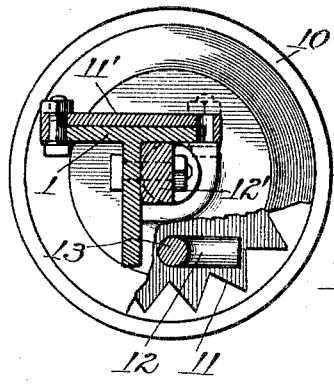
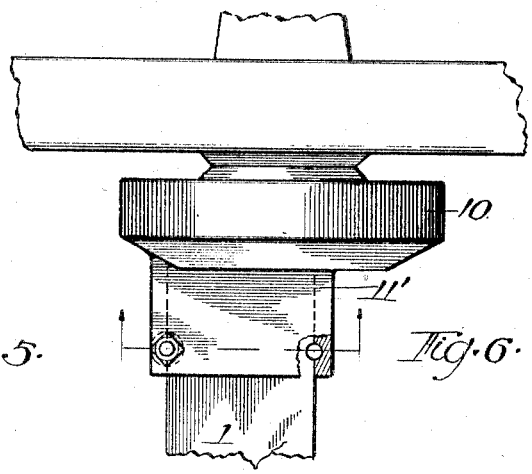
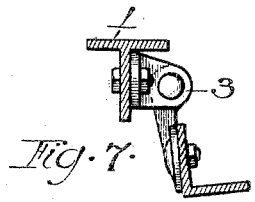
Witnesses:
G. H. Alfreds.
J. N. Daggett.
Inventor:
Franklin P. Burkhardt.
By E. W. Burgess
Attorney.

No. 766,928. Patented August 9, 1904.

UNITED STATES PATENT OFFICE.

FRANKLIN P. BURKHARDT, OF SPRINGFIELD, OHIO.

HAY-RAKE.

SPECIFICATION forming part of Letters Patent No. 766,928, dated August 9, 1904.

Application filed February 15, 1904. Serial No. 193,678. (No model.)

*To all whom it may concern:*

Be it known that I, FRANKLIN P. BURKHARDT, a citizen of the United States, residing at Springfield, in the county of Clark and State of Ohio, have invented certain new and useful Improvements in Hay-Rakes, of which the following is a specification, reference being had to the accompanying drawings, forming a part thereof.

This invention relates to horse hay-rakes of the draft-dump type, wherein the rake-head is caused to rock about the axis of the draft-wheels by means of pawls engaging with wheel-ratchets and controlled in their movement by means of tripping mechanism under the control of the operator; and it consists of a novel means for rocking the trip-rod about its axis and simultaneously unlocking the toggle-lever construction of the dumping connections, of a novel adjustable unlocking means for disengaging the dumping-pawls from the wheel-ratchets, and other features, which will be more particularly described in the accompanying specification.

The objects of the invention are to provide a means for locking the mechanism in operative position and to connect said means with the trip-lever mechanism, so that the locking mechanism will be under the control of the operator, and to provide an adjustable stop or limit to the dumping movement of the head. I attain these objects by the mechanism illustrated by the accompanying drawings and described in the specification, in which the same reference-numerals designate like parts throughout the various figures, in which—

Figure 1 is a plan view of a hay-rake embodying my invention. Fig. 2 is a section on line A B of Fig. 1. Fig. 3 is a sectional elevation of a part of Fig. 2 with the teeth raised. Fig. 3ª is a view of Fig. 2 with the teeth raised, as in Fig. 3. Fig. 4 is a perspective of a part of the dumping mechanism. Fig. 5 is a detail of the axle-support, showing the manner of securing it to the T-shaped head, also a partial view of one of the wheel-ratchets and an engaging pawl. Fig. 6 is a top plan view of Fig. 5. Fig. 7 is a detail of one of the draft connections.

The numeral 1 denotes the rake-head, having a cross-section substantially T shape in form.

2 is the thill-frame, pivotally connected to the head by means of the hinge-pieces 3 in connection with the draft-bar 4, the thills 5 and 6 being secured to the thill-frame in the usual manner, and the usual swingletree 7 and draft connection 8. The axle-supporting parts 9 and 10 are secured to the ends of the head, and the wheel-hubs are provided with driving-ratchets 11 of a well-known form, with which the pawls 12 engage when it is desired to dump the rake. The pawls are formed integral with the dumping-rods 13 and 14, that are designed to rock in bearings secured to the lower side of the rake-head, as shown in Fig. 4, having their outer ends journaled in the axle-supporting castings 9 and 10, as shown in Figs. 2 and 5. The inner ends of the rods are formed with L-shaped ends that are seated in joint-plates $14^2$ and $14^3$ in a manner permitting a limited independent movement of the two members of the rock-shaft against the action of springs 14', which are placed beneath the L-shaped ends and operate to hold them against the upper inner surface of the joint-plates, as shown in Figs. 2, 3, and 3ª. An arm 15 forms part of one of the joint-plates, and to the end of the arm is pivoted a link 16, that slides through an opening in the lower web of the rake-head, and a spiral spring 17, surrounding its outer end, operates to draw the link through the hole and rock the dumping-rods on their axis and hold the pawls away from the ratchet-teeth on the wheel-hubs.

18 is a small bell-crank lever pivoted on the thill-frame, and 19 is a foot-lever having a form similar to a double crank, which is supported in bearings 20 and 21 on the thill-frame 2. One of the cranks 22 extends forward and upward in convenient position for the operator's foot, and the other extends rearward and laterally for a purpose to be described later. To the foot-crank 22 is pivotally connected one end of a link 23, having its opposite end pivotally connected with one arm of the bell-crank lever 18, and a link 24 connects the other arm of lever 18 with the arm 15. Pressure being applied to the crank portion 22 of the foot-lever, it will be rocked about its axis and draw forward on the rod 23, which through its connection with the bell-crank 18 will operate to draw forward on the arm 15 and rock the dump-rods and throw the pawls into engagement with the wheel-ratchets. To disengage the pawls from the wheel-ratchets, there is provided a curved arm 25, that is held between the joint-plates connecting the two members of the dump-rod. The arm is made approximately concentric with the axis of the rake-head and is provided with an adjustable block 26 at its free end, that is held in place by means of the set-screw 27. The rake-head turning on its axis during the operation of dumping the load carries with it the dumping-rods and arm 25, the latter moving close to the draft-bar 4 in position to bring the adjustable block 26 against the said draft-bar to disengage the pawls from the wheel-ratchets. To regulate the height to which it is desired to lift the teeth to dump the load is the function of the adjustable block 26, which may be adjusted to any position on the curved arm 25.

The means for holding the rake in operative position consists of the following: To the rake-head is secured an arm 28, to which is pivoted one end of a bar 29, that projects forward of the draft-frame and has a foot-piece 30 formed thereon. The bar 29 is connected intermediate its length to an ear portion 31 by means of a link 32. The part 31 is provided with a set-screw 33, with which the bar 29 contacts when the rake is in operative position, and by means of said set-screw the pivotal point of connection between the link 32 and the bar 29 may be allowed to assume a position relative to a straight line drawn between the pivotal connections of the bar 29 with the arm 28 and the link 32 with the part 33 in a manner to positively lock the rake in operative position. When the controlling means are adjusted in this manner, it is necessary to provide some mechanism for unlocking it before the dumping-ratchets are caused to engage with the pawls to dump the rake. To effect this purpose is one of the functions of the double-crank foot-lever 22. As shown in Fig. 1, the foot-lever is provided with a rearwardly-extending arm 34, approximately parallel with the bar 29, and the laterally-extending portion 35, that is arranged to project under the link 32, with which it contacts when pressure is applied to the foot-lever to trip the rake-pawls into engagement with the ratchets—that is, there will be a simultaneous unlocking of the toggle-links holding the rake in operative position and rocking of the dump-rods to effect engagement of the dumping pawls and ratchets.

The manner of securing the axle-supports to the T-shaped head is shown in Figs. 5 and 6, where the part 10 is provided with a longitudinally-extending ear 11', adapted to be secured to the upper surface of the T-shaped head, and another ear 12', adapted to be secured to the depending web 13' of said head.

Various changes may be made in the construction and location of the various parts without departing from the spirit of my invention.

What I claim, and desire to secure by Letters Patent, is—

1. In a hay-rake the combination of, a head having teeth secured thereto, carrying-wheels journaled on stub-axles attached to said head, a draft-frame pivotally connected with said head, a rock-shaft journaled in bearings secured to said head said rock-shaft provided with means at its opposite ends for engaging with said wheels, means for causing said rock-shaft to engage with said wheels comprising a foot-lever pivotally connected with the draft-frame, a radial arm secured to the rock-shaft, a bell-crank lever pivotally connected with the draft-frame and link connections between the foot-lever, the radial arm, and the two arms of the bell-crank lever.

2. In a hay-rake the combination of, a head having teeth secured thereto, carrying-wheels journaled on stub-axles attached to said head, a draft-frame pivotally connected with said head, a rock-shaft journaled in bearings secured to said head, hubs having ratchet-teeth forming a part of said wheels, said rock-shaft provided with pawls adapted to engage with said ratchet-teeth, means for causing said pawls to engage with said teeth comprising a foot-lever pivotally connected with the draft-frame, a radial arm secured to said rock-shaft, a bell-crank lever pivotally connected with the draft-frame and link connections between the foot-lever, the radial lever and the two arms of the bell-crank lever.

3. In a hay-rake the combination of, the carrying-wheels, a tooth-supporting head adapted to rock about the axis of said wheels, means carried by the head for locking said head with the wheels to discharge the accumulated load, a draft-frame pivotally connected with said head, means for holding the head in raking position comprising a radial arm secured to the head, a bar pivotally connected at its rear end with the radial arm and having a foot-piece at its forward end, a link connecting the bar intermediate its ends with the draft-frame, a foot-lever mounted on the draft-frame, connections between said foot-lever and said wheels and head-locking means, and an arm on said foot-lever operating to raise the outer end of the combined holding-bar and foot-piece.

4. In a hay-rake the combination of the carrying-wheels, a tooth-supporting head adapted to rock about the axis of said wheels, a draft-frame pivotally connected to said head and including a transverse draft-bar below the rake-head, hubs having radial teeth forming a part of said wheels, a rock-shaft journaled in bearings secured to said head, a pawl on the end of said rock-shaft adapted to engage with the teeth in one of said wheel-hubs, means for rocking said shaft in its bearings to cause said pawls to engage with the teeth, and other means for disengaging said pawls comprising a curved arm secured to the shaft and encircling the draft-bar from below, a projection on the curved arm that contacts with the draft-frame in dumping the load and rocks the pawl-shaft in its bearings.

5. In a hay-rake the combination of the carrying-wheels, a tooth-supporting head adapted to rock about the axis of said wheels, a draft-frame pivotally connected to said head and including a transverse draft-bar below the rake-head, hubs having radial teeth forming a part of said wheels, a rock-shaft journaled in bearings secured to said head, a pawl on the end of said shaft adapted to engage with the teeth in one of said wheel-hubs, means for rocking said shaft in its bearings to cause said pawls to engage with the teeth, and other means for disengaging said pawls comprising a curved arm secured to the shaft and encircling the draft-bar from below, an adjustable block on the curved arm that contacts with the draft-frame and rocks the pawl-shaft in its bearings as the head reaches the limit of its rocking movement in dumping the load.

In witness whereof I hereto affix my signature in presence of two witnesses.

FRANKLIN P. BURKHARDT.

Witnesses:
WILLIAM H. GUTHRIE, Jr.,
H. B. SPERRY.